(12) United States Patent
Mori et al.

(10) Patent No.: US 7,212,362 B2
(45) Date of Patent: May 1, 2007

(54) METHOD AND APPARATUS FOR DETECTING SHOCK-RESISTANCE PERFORMANCE

(75) Inventors: Takahiro Mori, Tokyo (JP); Yoshihisa Higuchi, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/283,790

(22) Filed: Nov. 22, 2005

(65) Prior Publication Data

US 2006/0119975 A1 Jun. 8, 2006

(30) Foreign Application Priority Data

Dec. 7, 2004 (JP) ............... 2004-353581

(51) Int. Cl.
  *G11B 27/36* (2006.01)
  *G11B 21/02* (2006.01)
(52) U.S. Cl. ........................... 360/31; 360/75
(58) Field of Classification Search ............ None
   See application file for complete search history.

(56) References Cited

U.S. PATENT DOCUMENTS

2006/0044658 A1* 3/2006 Ma .................. 360/31

FOREIGN PATENT DOCUMENTS

JP 11-203637 7/1999

* cited by examiner

*Primary Examiner*—Andrew L. Sniezek
(74) *Attorney, Agent, or Firm*—Buchanan Ingersoll & Rooney PC

(57) ABSTRACT

A method for detecting a shock resistance performance of a magnetic head support member in a magnetic disk drive apparatus includes a step of loading a magnetic head supported by the magnetic head support member above a magnetic disk on which servo information have been preliminarily recorded, a step of measuring off-track positions of the magnetic head and reproduced outputs $OUT_{NOIM}$ of the magnetic head at the respective off-track positions when no shock is applied, a step of storing the measured off-track positions and the measured reproduced outputs $OUT_{NOIM}$ at the respective off-track positions, a step of measuring off-track positions of the magnetic head and reproduced outputs $OUT_{IM}$ of the magnetic head when a shock is applied, and a step of obtaining a change in flying height of the magnetic head from the measured reproduced output $OUT_{IM}$ of the magnetic head when the shock is applied and from the stored reproduced output $OUT_{NOIM}$ of the magnetic head when no shock is applied depending upon the measured off-track position of the magnetic head when the shock is applied.

12 Claims, 7 Drawing Sheets

METHOD AND APPARATUS FOR DETECTING SHOCK-RESISTANCE PERFORMANCE

PRIORITY CLAIM

This application claims priority from Japanese patent application No. 2004-353581, filed on Dec. 7, 2004, which is incorporated herein by reference.

BACKGROUND OF THE INVENTION

1. Field of the Invention

The present invention relates to a method and apparatus for detecting a shock-resistance performance of a head support member in a magnetic disk drive.

2. Description of the Related Art

Japanese patent publication No. 11-203637A discloses a contact detection device for detecting a contact between a head slider supported by a slider arm and a magnetic disk by sensing an acoustic wave produced on the slider arm due to the contact.

This known contact detection device can detect the contact between the magnetic disk surface and the head slider, but cannot detect a change in flying height of the head slider when the slider flies without contact. Thus, it is impossible to correctly detect a shock-resistance performance of a head support member such as a suspension when a shock or impact is applied to a magnetic disk drive.

In order to correctly detect the flying-height change, the inventors of this application have shot, by using a high-speed camera, movement of the suspension when a shock is applied thereto, and have obtained a change in flying height of the head slider or the suspension with respect to the magnetic disk surface from the shot image.

However, according to this conventional detection method using the high-speed camera, when the shock applied increases, the moving speed of the head slider and the suspension increases to decrease the resolution of each frame. Due to this decreasing in the resolution and the limitation of the shutter speed, spreading of light or blurring may occur in the image causing analysis of the image to make extremely difficult.

There is a method for detecting a change in flying height of the head slider without using a high-speed camera. According to this method, magnetic information signals previously recorded on a magnetic disk are read out by the magnetic head and the reproduced signal from the head is monitored when a shock is applied. Although this method can execute the detection even when a large shock is applied, correct detection of a change in flying height cannot be expected because the reproduced signal from the magnetic head varies depending upon the direction of the shock applied thereto.

SUMMARY OF THE INVENTION

It is therefore an object of the present invention to provide a method and apparatus for detecting a shock-resistance performance, whereby a change in the flying height of a magnetic head can be precisely detected even when a large shock is applied.

Another object of the present invention is to provide a method and apparatus for detecting a shock-resistance performance, whereby a change in the flying height of a magnetic head can be precisely detected irrespective of the direction of a shock applied.

Further object of the present invention is to provide a method and apparatus for detecting a shock-resistance performance, whereby the detection can be realized by a simple configuration of the apparatus.

According to the present invention, a method for detecting a shock resistance performance of a magnetic head support member in a magnetic disk drive apparatus includes a step of loading a magnetic head supported by the magnetic head support member above a magnetic disk on which servo information have been preliminarily recorded, a step of measuring off-track positions of the magnetic head and reproduced outputs $OUT_{NOIM}$ of the magnetic head at the respective off-track positions when no shock is applied, a step of storing the measured off-track positions and the measured reproduced outputs $OUT_{NOIM}$ at the respective off-track positions, a step of measuring off-track positions of the magnetic head and reproduced outputs $OUT_{IM}$ of the magnetic head when a shock is applied, and a step of obtaining a change in flying height of the magnetic head from the measured reproduced output $OUT_{IM}$ of the magnetic head when the shock is applied and from the stored reproduced output $OUT_{NOIM}$ of the magnetic head when no shock is applied depending upon the measured off-track position of the magnetic head when the shock is applied.

Reproduced outputs $OUT_{NOIM}$ of the magnetic head at the respective off-track positions (deviated amounts from the track center) when no shock is applied are preliminarily measured and stored. Then, off-track positions of the magnetic head and reproduced outputs $OUT_{IM}$ of the magnetic head when a shock is applied are measured. Thereafter, each measured reproduced output $OUT_{IM}$ is compensated by a compensation amount that is derived from the stored reproduced output $OUT_{NOIM}$ in response to the measured off-track position of the magnetic head when a shock is applied to obtain a reproduced output component that corresponds to the flying-height change of the magnetic head. Because the flying-height change of the magnetic head is detected by utilizing electrical signals such as the reproduced output of the magnetic head and the off-track position signal of the magnetic head, it is possible to precisely detect a flying-height change even if the a strong shock is applied. Also, because the reproduced output is compensated depending upon the deviated amount from the track center, a flying-height change can be precisely detected irrespective of the direction of the applied shock, that is, when the shock is externally applied from any direction. Furthermore, because the flying-height change of the magnetic head is detected from the reproduced output of the magnetic head and servo information, the flying-height change detection can be easily performed by an apparatus with a simple configuration.

It is preferred that the obtaining step includes calculating a difference between the measured reproduced output $OUT_{IM}$ of the magnetic head when the shock is applied and the stored reproduced output $OUT_{NOIM}$ of the magnetic head when no shock is applied at an off-track position that corresponds to the measured off-track position of the magnetic head when the shock is applied.

It is also preferred that the measuring step when no shock is applied includes measuring the servo information recorded on the magnetic disk and calculating the off-track positions from the measured servo information.

It is also preferred that the measuring step when a shock is applied includes measuring the servo information recorded on the magnetic disk and calculating the off-track position from the measured servo information.

It is further preferred that the method further includes a step of measuring a value of the shock applied by using an acceleration sensor.

It is still further preferred that the measuring step of the off-track position when a shock is applied includes changing the shock applied and measuring the off-track position of the magnetic head when the changed shock is applied.

According to the present invention, also, an apparatus for detecting a shock resistance performance of a magnetic head support member in a magnetic disk drive apparatus includes a first means for measuring, when no shock is applied, off-track positions of a magnetic head supported by the magnetic head support member and loaded onto a magnetic disk on which servo information have been preliminarily recorded, and reproduced outputs $OUT_{NOIM}$ of the magnetic head at the respective off-track positions, a second means for storing the measured off-track positions and the measured reproduced outputs $OUT_{NOIM}$ at the respective off-track positions, a third means for measuring an off-track position of the magnetic head and a reproduced output $OUT_{IM}$ of the magnetic head when a shock is applied, and a fourth means for obtaining a change in flying height of the magnetic head from the reproduced output $OUT_{IM}$ of the magnetic head measured by the third means and from the stored reproduced output $OUT_{NOIM}$ of the magnetic head measured by the first means depending upon the off-track position of the magnetic head measured by the third means.

Reproduced outputs $OUT_{NOIM}$ of the magnetic head at the respective off-track positions (deviated amounts from the track center) when no shock is applied are preliminarily measured and stored. Then, off-track positions of the magnetic head and reproduced outputs $OUT_{IM}$ of the magnetic head when a shock is applied are measured. Thereafter, each measured reproduced output $OUT_{IM}$ is compensated by a compensation amount that is derived from the stored reproduced output $OUT_{NOIM}$ in response to the measured off-track position of the magnetic head when a shock is applied to obtain a reproduced output component that corresponds to the flying-height change of the magnetic head. Because the flying-height change of the magnetic head is detected by utilizing electrical signals such as the reproduced output of the magnetic head and the off-track position signal of the magnetic head, it is possible to precisely detect a flying-height change even if the a strong shock is applied. Also, because the reproduced output is compensated depending upon the deviated amount from the track center, a flying-height change can be precisely detected irrespective of the direction of the applied shock, that is, when the shock is externally applied from any direction. Furthermore, because the flying-height change of the magnetic head is detected from the reproduced output of the magnetic head and servo information, the flying-height change detection can be easily performed by an apparatus with a simple configuration.

It is preferred that the fourth means includes means for calculating a difference between the reproduced output $OUT_{IM}$ of the magnetic head measured by the third means and the stored reproduced output $OUT_{NOIM}$ of the magnetic head measured by the first means at an off-track position that corresponds to the off-track position of the magnetic head measured by the third means.

It is also preferred that the first means includes means for measuring the servo information recorded on the magnetic disk and means for calculating the off-track positions from the measured servo information.

It is further preferred that the third means includes means for measuring the servo information recorded on the magnetic disk and means for calculating the off-track position from the measured servo information.

It is still further preferred that the apparatus further includes a fifth means for measuring a value of the shock applied by using an acceleration sensor.

It is further preferred that the third means includes means for changing a value of the shock applied and means for measuring the off-track positions of the magnetic head when the changed shock is applied.

Further objects and advantages of the present invention will be apparent from the following description of the preferred embodiments of the invention as illustrated in the accompanying drawings.

DESCRIPTION OF THE PREFERRED EMBODIMENTS

Figure 1:
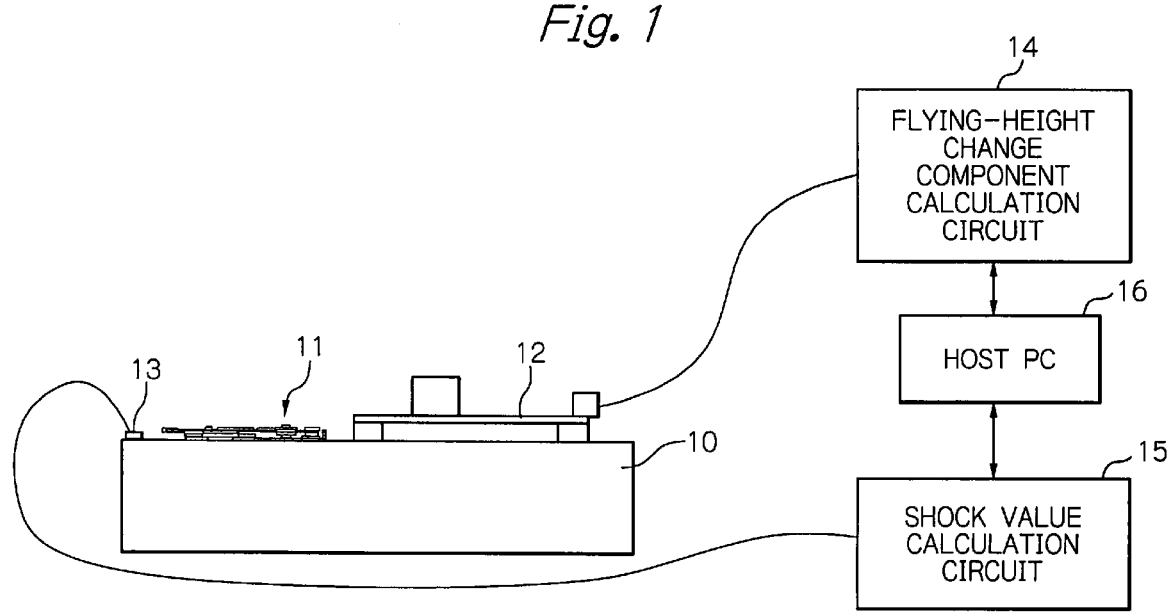
FIG. 1 is a view schematically illustrating a configuration of a shock-resistance detection apparatus of a hard disk drive (HDD) as a preferred embodiment according to the present invention.
Figure 2:
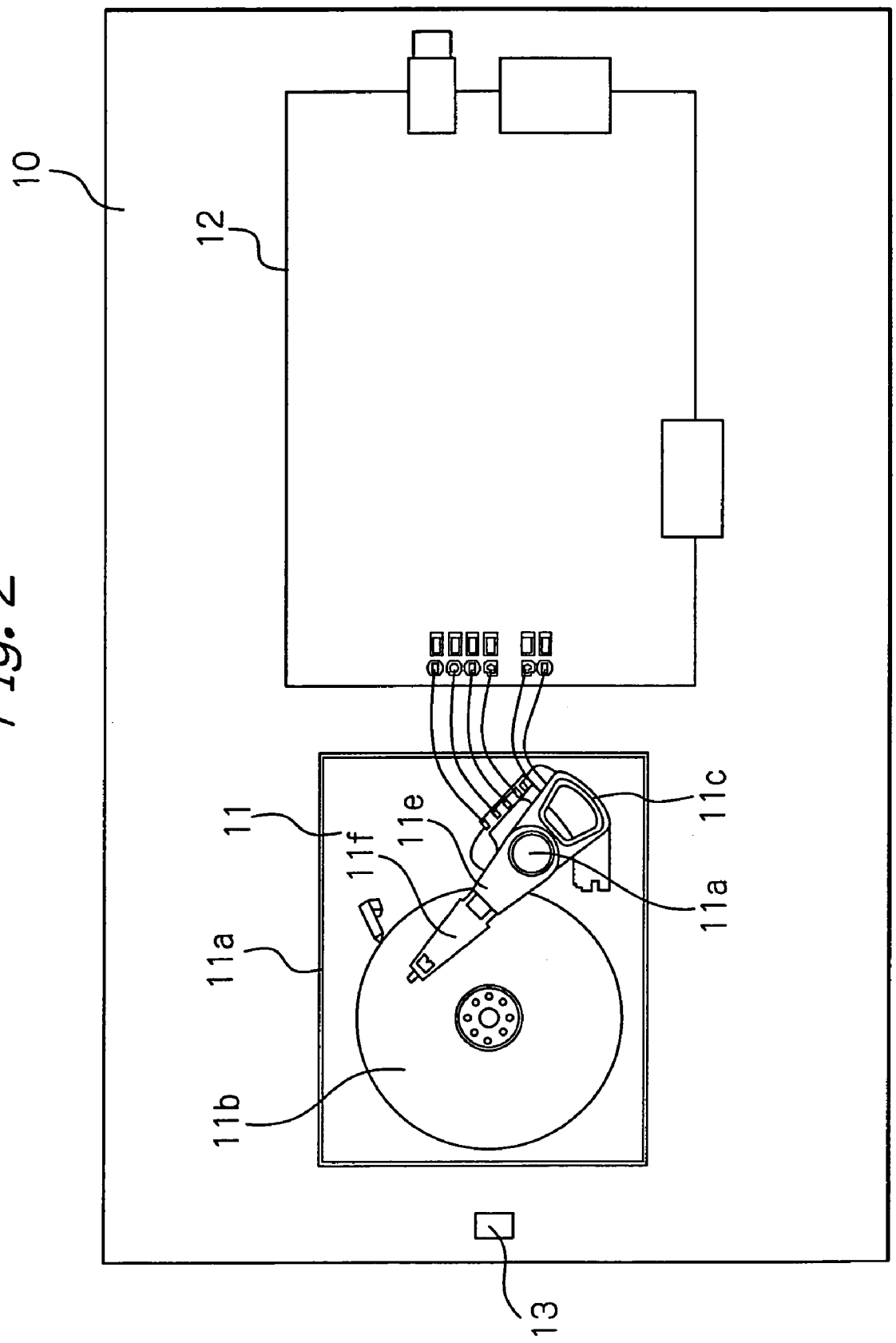
FIG. 2 is a plane view illustrating a part of the device in the embodiment of FIG. 1.

FIG. 1 schematically illustrates a configuration of a shock-resistance detection apparatus of an HDD as a preferred embodiment according to the present invention, and FIG. 2 illustrates a part of the HDD of FIG. 1.

In these figures, reference numeral 10 denotes a base, 14 denotes a flying-height change component calculation circuit, 15 denotes a shock value calculation circuit, and 16 denotes a host computer, respectively. On the base, the HDD 11 of which shock-resistance performance is to be detected, a substrate 12 with a signal amplifier unit, and an acceleration sensor 13 are mounted. The flying-height change component calculation circuit 14 calculates a flying-height change of the magnetic head based upon an output signal of the magnetic head and a servo signal applied thereto from the signal amplifier unit 12. The shock value calculation circuit 15 calculates a value of shock applied to the HDD 11 based upon an input signal from the acceleration sensor 13 mounted on the base 10. The host computer 16 not only controls general operations of the HDD 11 but also finally obtains a shock-resistance performance with respect to a value of shock applied to the HDD based upon an output signal from the flying-height change component calculation circuit 14, which represents a flying-height change of the magnetic head, and upon a shock value signal from the shock value calculation circuit 15.

The HDD 11 has a typical configuration provided with, in a housing 11a, a magnetic disk 11b, a spindle motor (not shown) for rotating the magnetic disk 11b, a support arm 11e rotatably attached to a horizontal-rotation pivot part 11d, a voice coil motor (VCM) with a coil part 11c attached to a rear end section of the support arm 11e, a suspension 11f attached to a top end section of the support arm 11e, and a magnetic head slider (not shown) mounted on a top end section of the suspension 11f.

Figure 3:
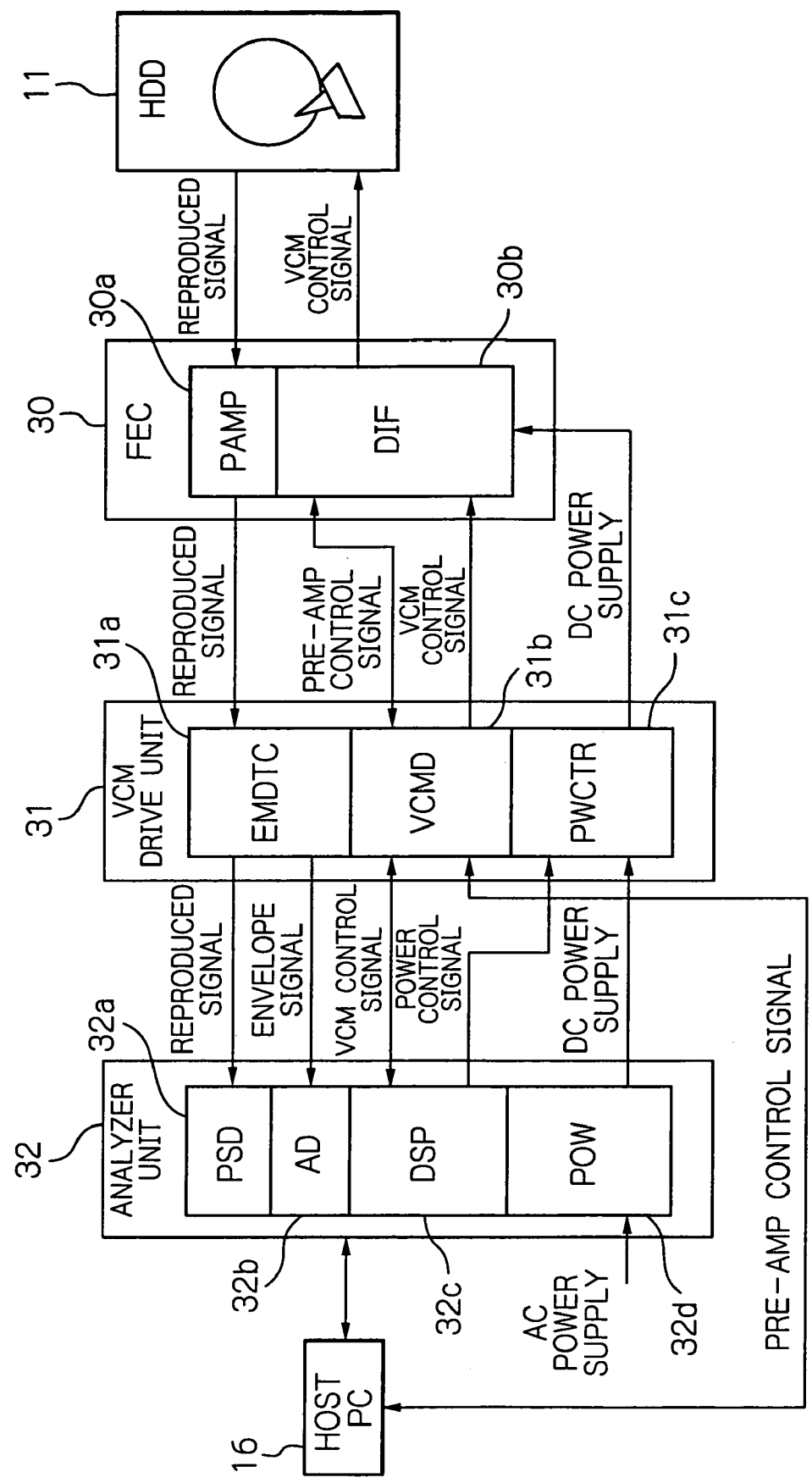
FIG. 3 is a block diagram illustrating a detection apparatus for detecting a reproduced output and an off-track position, which includes a flying-height change component calculation circuit in the embodiment of FIG. 1.

FIG. 3 illustrates a detection apparatus for detecting a reproduced output and an off-track position, which includes a flying-height change component calculation circuit in this embodiment.

As shown in the figure, a front end control (FEC) unit 30 is mainly constituted by a preamplifier part (PAMP) 30a for amplifying a reproduced signal from the magnetic head of the HDD 11, and a digital interface part (DIF) 30b for the preamplifier. A VCM drive unit (VCM DRIVE UNIT) 31 is mainly constituted by an envelope detector part (EMDTC) 31a for detecting an envelope from the reproduced signal, a VCM drive part (VCMD) 31b, and a FEC power control part (PWCTR) 31c. An analyzer unit (ANALYZER UNIT) 32 is mainly constituted by a position signal detector part (PSD) 32a for detecting a position of the magnetic head by deriving servo information from the reproduced signal, an A/D conversion part (AD) 32b for analog to digital converting signals such as the envelope signal, a VCM control and data processing part (DSP) 32c, and a controlled power supply part (POW) 32d. The host computer (HOST PC) 16 controls these units to detect a flying-height corresponding component of the magnetic head.

Figure 4:
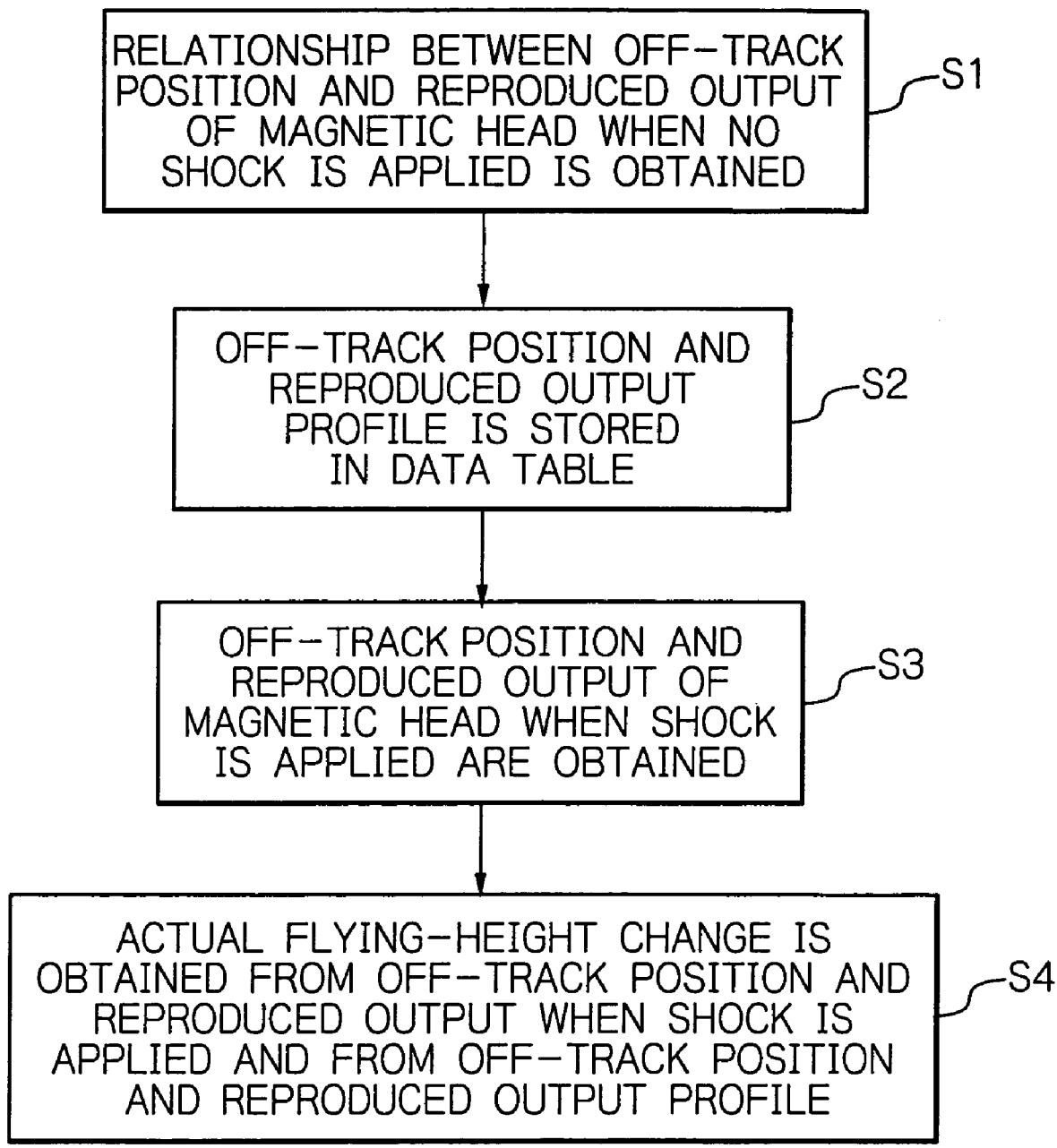
FIG. 4 is a flow chart illustrating a flying-height change calculation routine executed by a host computer.

FIG. 4 illustrates a flying-height change calculation routine executed by the host computer 16.

First, a relationship between the off-track position and the reproduced output of the magnetic head when no shock is applied to the base 10 shown in FIG. 1 that is the HDD 11 is obtained (Step S1). More concretely, servo information are preliminarily recorded on the magnetic disk 11b, and then the magnetic head mounted on the suspension 11f is loaded onto the magnetic disk 11b to bring the HDD in servo controlled state. Then, while no shock is applied to the HDD and the magnetic head slider is kept at the normal flying state, seek operation of the magnetic head, that is moving operation of the magnetic head from the track center toward the track width directions is performed. During this seek operation, off-track positions of the magnetic head are calculated based upon servo information derived from the reproduced signals of the magnetic head measured by sampling, and also reproduced outputs $OUT_{NOIM}$ that represent envelopes of the reproduced signals at the respective off-track positions are measured by sampling. The off-track positions of the magnetic head are in actually obtained by calculating the servo position information at the VCM control and data processing part 32c shown in FIG. 3 and by sending the calculated servo position information to the host computer 16.

Then, the calculated off-track positions (deviated amounts from the track center) and the measured reproduced outputs $OUT_{NOIM}$ at the respective off-track positions are stored in an off-track position data table as an off-track position and reproduced output profile (Step S2).

Figure 5:
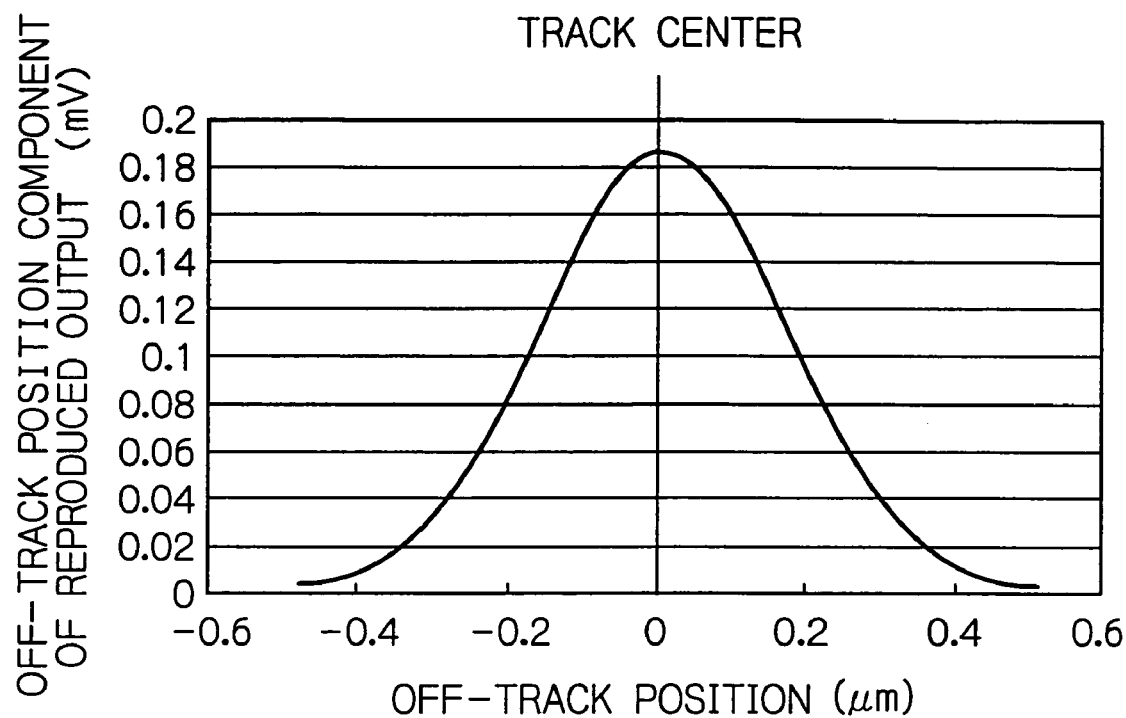
FIG. 5 is a graph illustrating an off-track position and reproduced output profile stored in a data table.

FIG. 5 and Table 1 indicate thus stored off-track position and reproduced output profile. In the table, each off-track position is indicated by a distance from the track center (μm) and each reproduced output is indicated by a voltage (mV). When the head position deviates from the track center, the reproduced output $OUT_{NOIM}$ of the magnetic head sharply drops depending upon the deviated amount.

TABLE 1

| | Off Track Position (μm) | | | | | |
|---|---|---|---|---|---|---|
| | −0.1 | −0.08 | −0.06 | −0.04 | −0.02 | 0 |
| Reproduced Output (mV) | 0.143 | 0.155 | 0.165 | 0.175 | 0.181 | 0.185 |
| | Off Track Position (μm) | | | | | |
| | 0.02 | 0.04 | 0.06 | 0.08 | 0.10 | |
| Reproduced Output (mV) | 0.185 | 0.182 | 0.176 | 0.168 | 0.158 | |

Then, an off-track position and a reproduced output of the magnetic head when a shock is externally applied to the HDD 11 is measured (Step S3). More concretely, the magnetic head is loaded onto the magnetic disk 11b on which servo information were preliminarily recorded, to bring the HDD in servo controlled state. Then, under this state, a shock is externally applied to the HDD. Off-track positions of the magnetic head are calculated based upon servo information derived from the reproduced signals of the magnetic head measured by sampling, and also reproduced outputs $OUT_{IM}$ that represent envelopes of the reproduced signals at the respective off-track position are measured by sampling. The shock is applied after a lapse of 150 (μsec) from the start of the sampling. The off-track positions of the magnetic head are in actually obtained by calculating the servo position information at the VCM control and data processing part 32c shown in FIG. 3 and by sending the calculated servo position information to the host computer 16. Thus, time-series data of the reproduced outputs $OUT_{IM}$ of the magnetic head and the off-track positions of the magnetic head at every sampling point are obtained. These obtained time-series data are temporally stored in a memory.

Thereafter, a reproduced output component corresponding to a true flying height change of the magnetic head is calculated from the time-series data of the reproduced outputs OUTS of the magnetic head and the off-track positions of the magnetic head when the shock is applied, and from the off-track position and reproduced output profile stored in the off-track position data table (Step S4). More concretely, a pair of the sampled reproduced output $OUT_{IM}$ of the magnetic head and the off-track position of the magnetic head at the sampling are read out from the memory, and the reproduced output $OUT_{NOIM}$ of the magnetic head when no shock is applied corresponding to this off-track position at the sampling is read out from the off-track position and reproduced output profile (Table 1) stored in the data table. Then, the difference D between the reproduced output $OUT_{IM}$ read out from the memory and the reproduced output $OUT_{NOIM}$ read out from the data table is calculated from $D = OUT_{IM} - OUT_{NOIM}$. This calculated difference D corresponds to the flying-height change component of the reproduced output at the sampling.

Figure 6:
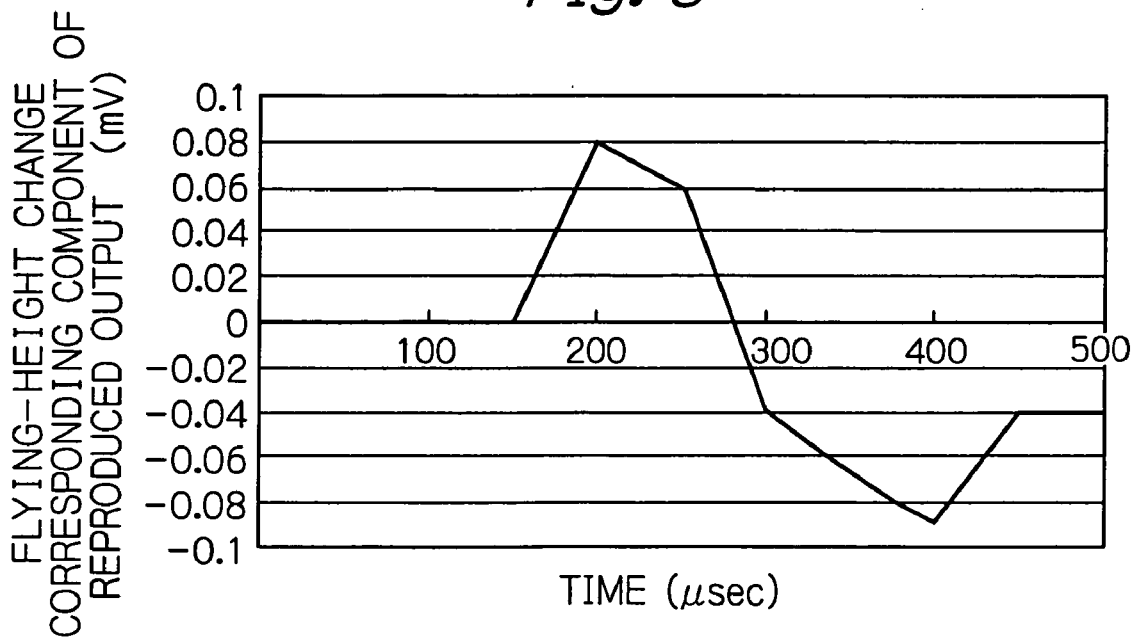
FIG. 6 is a graph illustrating a profile of a reproduced output component corresponding to a flying-height change.

Table 2 represents the time-series data of the reproduced output $OUT_{IM}$ at each sampling and the off-track position at that time and the flying-height change corresponding component of the reproduced output calculated or compensated as aforementioned, and FIG. 6 represents this flying-height change corresponding component, namely the reproduced output component corresponding to the flying-height change. In Table 2 and FIG. 6, the time is indicated by a lapse of time (μsec) from the start of the sampling, each off-track position is indicated by a distance from the track center (μm) and each reproduced output and the flying-height change corresponding component of the reproduced output are indicated by a voltage (mV). As aforementioned, a shock is applied to the HDD at the time of 150 (μsec).

TABLE 2

|  | Time (μsec) | | | | |
| --- | --- | --- | --- | --- | --- |
|  | 0 | 50 | 100 | 150 | 200 |
| Reproduced Output (mV) | 0.185 | 0.175 | 0.176 | 0.175 | 0.193 |
| Off Track Position (μm) | 0 | −0.04 | 0.06 | −0.04 | 0.02 |
| Flying-Height Change Component of Reproduced Output (mV) | 0 | 0 | 0 | 0 | 0.08 |

|  | Time (μsec) | | | | |
| --- | --- | --- | --- | --- | --- |
|  | 250 | 300 | 350 | 400 | 450 |
| Reproduced Output (mV) | 0.187 | 0.181 | 0.174 | 0.173 | 0.177 |
| Off Track Position (μm) | −0.02 | 0 | −0.02 | 0.04 | −0.02 |
| Flying-Height Change Component of Reproduced Output (mV) | 0.06 | −0.04 | −0.07 | −0.09 | −0.04 |

As shown in Table 2, although no flying-height change should be theoretically occurred until the time of 150 (μsec) at which a shock was applied, the reproduced outputs $OUT_{IM}$ sampled before the time of 150 (μsec) have values other than zero. Therefore, according to the present invention, the compensation based upon the off-track positions of the magnetic head is performed using the off-track position and reproduced output profile shown in Table 1. As a result, the flying-height change corresponding component of the reproduced output shown in Table 2 and FIG. 6, which is kept zero but starts to change after the time of 150 (μsec) at which the shock was applied, can be obtained.

Figure 7:
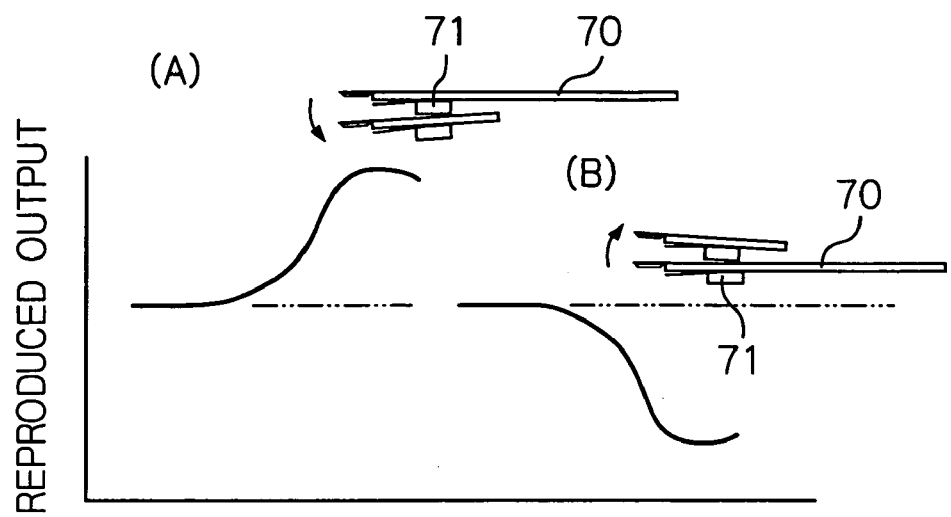
FIG. 7 is a view illustrating change in the reproduced output from the magnetic head depending upon the distance between the magnetic head and the magnetic disk surface.
Figure 8:
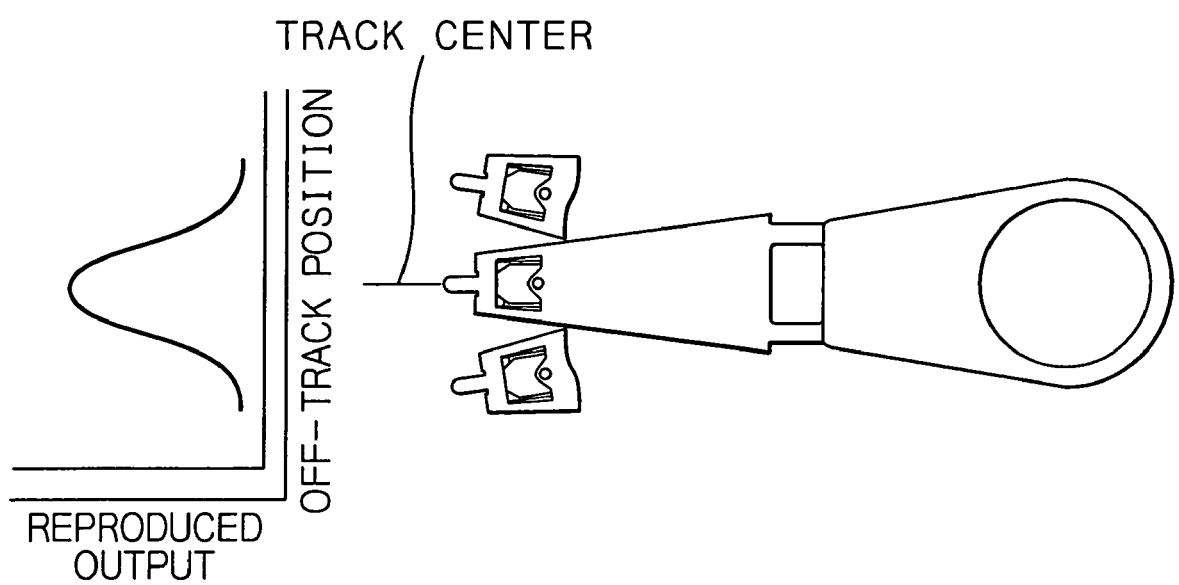
FIG. 8 is a view illustrating change in the reproduced output from the magnetic head depending upon the off-track position.

In general, a reproduced output of the magnetic head increases when the suspension 70 bends to the downward direction and the magnetic head 71 moves closer to the magnetic disk surface as shown in the part (A) of FIG. 7. Contrary to this, the reproduced output decreases when the suspension 70 bends to the upward direction and the magnetic head 71 moves away from the magnetic disk surface as shown in the part (B) of FIG. 7. Also, the reproduced output of the magnetic head greatly varies, as shown in FIG. 8, depending upon the off-track position that is a deviated amount from the track center. Thus the reproduced output of the magnetic head when a shock is externally applied thereto becomes a resultant value combining the component due to the flying-height change and the component due to the off-track position. According to the present invention, therefore, the off-track position component is subtracted from the reproduced output to obtain the component of the reproduced output, which only corresponds to the change in flying height.

Figure 9:
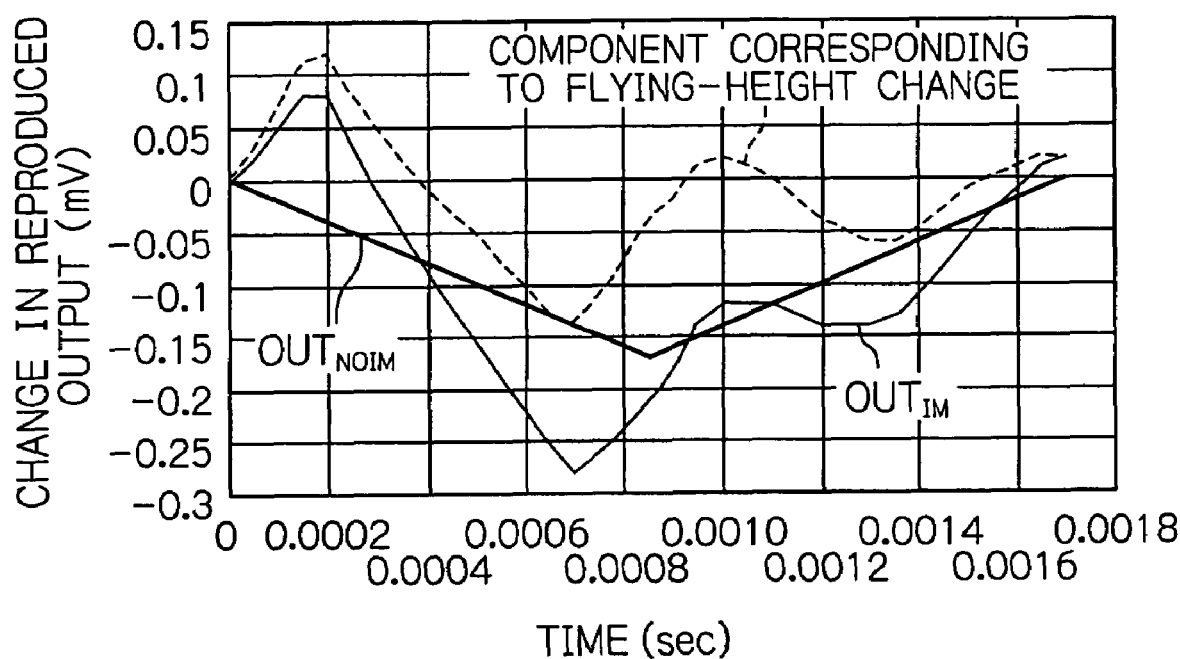
FIG. 9 is a graph illustrating that a flying-height change component of a reproduced output of the magnetic head can be obtained from the reproduced output when a shock is applied thereto and from an off-track position component of the reproduced output.

As shown in FIG. 9, by subtracting the off-track position component $OUT_{NOIM}$ of the reproduced output of the magnetic head from the reproduced output $OUT_{IM}$ of the magnetic head when a shock is applied thereto, it is possible to obtain the flying-height change corresponding component of the reproduced output ($OUT_{IM}-OUT_{NOIM}$).

As aforementioned, according to the present invention, because a change in flying height of a magnetic head is detected by utilizing electrical signals such as a reproduced output of the magnetic head and a off-track position signal of the magnetic head, the flying-height change can be precisely detected even if the a strong shock is applied. Also, because the reproduced output is compensated depending upon a deviated amount from the track center, a flying-height change can be precisely detected irrespective of the direction of the applied shock, that is, when the shock is externally applied from any direction. Furthermore, because a change in flying height of a magnetic head is detected from a reproduced output of the magnetic head and servo information, the flying-height change detection can be easily performed by an apparatus with a simple configuration.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method for detecting a shock resistance performance of a magnetic head support member in a magnetic disk drive apparatus, comprising the steps of:
   loading a magnetic head supported by said magnetic head support member above a magnetic disk on which servo information have been preliminarily recorded;
   measuring off-track positions of said magnetic head and reproduced outputs $OUT_{NOIM}$ of said magnetic head at the respective off-track positions when no shock is applied;
   storing the measured off-track positions and the measured reproduced outputs $OUT_{NOIM}$ at the respective off-track positions;
   measuring off-track positions of said magnetic head and reproduced outputs $OUT_{IM}$ of said magnetic head when a shock is applied; and
   obtaining a change in flying height of said magnetic head from the measured reproduced output $OUT_{IM}$ of said magnetic head when the shock is applied and from the stored reproduced output $OUT_{NOIM}$ of said magnetic head when no shock is applied depending upon the measured off-track position of said magnetic head when the shock is applied.

2. The method as claimed in claim 1, wherein the obtaining step comprises calculating a difference between the measured reproduced output $OUT_{IM}$ of said magnetic head when the shock is applied and the stored reproduced output $OUT_{NOIM}$ of said magnetic head when no shock is applied at an off-track position that corresponds to the measured off-track position of said magnetic head when the shock is applied.

3. The method as claimed in claim 1, wherein the measuring step when no shock is applied comprises measuring the servo information recorded on the magnetic disk and calculating the off-track positions from the measured servo information.

4. The method as claimed in claim 1, wherein the measuring step when a shock is applied comprises measuring the servo information recorded on the magnetic disk and calculating the off-track positions from the measured servo information.

5. The method as claimed in claim 1, wherein said method further comprises a step of measuring a value of the shock applied by using an acceleration sensor.

6. The method as claimed in claim 1, wherein the measuring step of the off-track positions when a shock is applied comprises changing a value of the shock applied and measuring the off-track positions of said magnetic head when the changed shock is applied.

7. An apparatus for detecting a shock resistance performance of a magnetic head support member in a magnetic disk drive apparatus, comprising:
- a first means for measuring, when no shock is applied, off-track positions of a magnetic head supported by said magnetic head support member and loaded above a magnetic disk on which servo information have been preliminarily recorded, and reproduced outputs $OUT_{NOIM}$ of said magnetic head at the respective off-track positions;
- a second means for storing the measured off-track positions and the measured reproduced outputs $OUT_{NOIM}$ at the respective off-track positions;
- a third means for measuring off-track positions of said magnetic head and reproduced outputs $OUT_{IM}$ of said magnetic head when a shock is applied; and
- a fourth means for obtaining a change in flying height of said magnetic head from the reproduced output $OUT_{IM}$ of said magnetic head measured by said third means and from the stored reproduced output $OUT_{NOIM}$ of said magnetic head measured by said first means depending upon the off-track position of said magnetic head measured by said third means.

8. The apparatus as claimed in claim 7, wherein said fourth means comprises means for calculating a difference between the reproduced output $OUT_{IM}$ of said magnetic head measured by said third means and the stored reproduced output $OUT_{NOIM}$ of said magnetic head measured by said first means at an off-track position that corresponds to the off-track position of said magnetic head measured by said third means.

9. The apparatus as claimed in claim 7, wherein said first means comprises means for measuring the servo information recorded on the magnetic disk and means for calculating the off-track positions from the measured servo information.

10. The apparatus as claimed in claim 7, wherein said third means comprises means for measuring the servo information recorded on the magnetic disk and means for calculating the off-track positions from the measured servo information.

11. The apparatus as claimed in claim 7, wherein said apparatus further comprises a fifth means for measuring a value of the shock applied by using an acceleration sensor.

12. The apparatus as claimed in claim 7, wherein said third means comprises means for changing a value of the shock applied and means for measuring the off-track positions of said magnetic head when the changed shock is applied.

* * * * *